Figure 1:
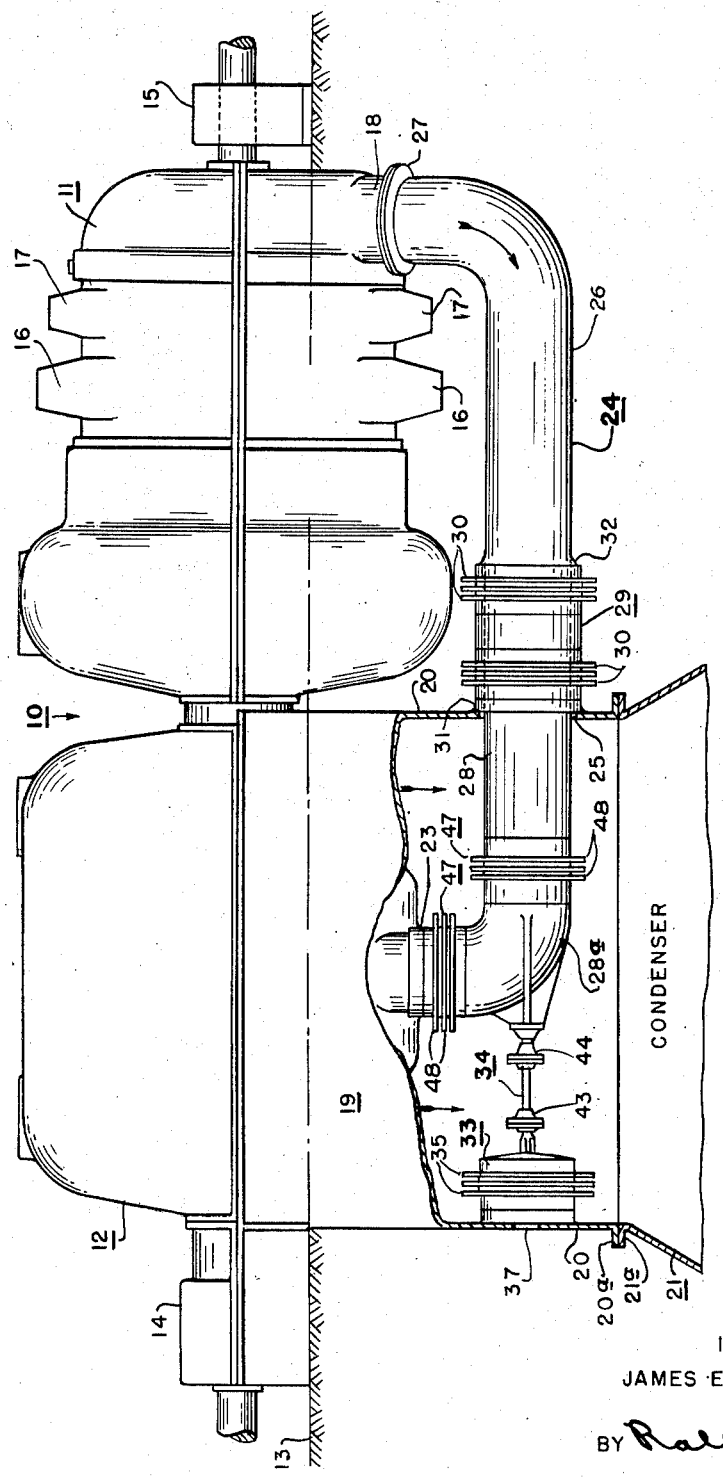

April 2, 1957 J. E. DONAHUE 2,787,124
PRESSURE COMPENSATED CONDUIT STRUCTURE
Filed May 23, 1955 2 Sheets-Sheet 1

FIG. I.

INVENTOR
JAMES EDWARD DONAHUE
BY Ralph T. French
ATTORNEY

April 2, 1957        J. E. DONAHUE        2,787,124
PRESSURE COMPENSATED CONDUIT STRUCTURE
Filed May 23, 1955                    2 Sheets-Sheet 2

INVENTOR
JAMES EDWARD DONAHUE
BY Ralph T. French
ATTORNEY

United States Patent Office 2,787,124
Patented Apr. 2, 1957

2,787,124

PRESSURE COMPENSATED CONDUIT STRUCTURE

James Edward Donahue, Swarthmore, Pa., assignor to Westinghouse Electric Corporation, East Pittsburgh, Pa., a corporation of Pennsylvania Application May 23, 1955, Serial No. 510,305

6 Claims. (Cl. 60—70)

This invention relates to a conduit arrangement, more particularly to an arrangement wherein different portions of the conduit are disposed in regions of different ambient pressures and are subject to unbalanced thrust forces imposed thereby, and has for an object to provide an improved arrangement for counterbalancing such forces.

Another object is to provide, in a conduit having different portions disposed in regions of different variable ambient pressures and subject to unbalanced variable thrust forces imposed thereby, an arrangement for imparting variable counterbalancing forces automatically to the conduit.

A further object is to provide a thrust compensated cross-under conduit for connecting a high-pressure unit and a low-pressure unit of a compound turbine, in which a portion of the conduit is disposed in the relatively low-pressure exhaust region of the low-pressure unit while the other portion of the conduit is subjected to the higher pressure values of the atmosphere.

A more specific object is to provide in a cross-under conduit of the above type and having a fluid-tight seal with the exhaust casing wall, a differential pressure-responsive means for exerting a thrust on the conduit in a direction to oppose and thereby counteract the atmospheric pressure thrust tending to move the conduit into the exhaust region of the low-pressure turbine unit.

Still another object is to provide a compound turbine in which the cross-under conduit is concealed from normal view, thereby enhancing the appearance of the installation.

Briefly, in one specific application of the invention wherein the exhaust steam of a high-pressure turbine unit is delivered to a low-pressure turbine unit for further expansion therein, the conduit connecting the two units is disposed below the units so that it is concealed from normal view of an observer. With this arrangement the conduit extends through the exhaust casing of the low-pressure unit adjacent the condenser connection and has a fluid-tight seal therewith, so that the portion of the conduit within the casing is subject to the relatively low pressure of the exhaust steam while the portion of the conduit outside the casing is subject to atmospheric pressure. The differential in pressure imposes a thrust on the conduit tending to move the conduit into the exhaust casing. It is desirable for obvious reasons to restrain such thrust rather than to permit the thrust to be transmitted to the turbine unit conduit connections. In accordance with the invention, a pressure-responsive means, for example, an expansible bellows is attached to the wall of the exhaust casing at a point opposite the conduit entry and is connected to the conduit by a force transmitting linkage. The interior chamber of the bellows is in communication with the atmosphere, while the exterior surface thereof is acted upon by the fluid pressure within the exhaust casing. The differential pressure across the bellows is thus effective to impose a counteracting thrust in a direction opposite to the thrust on the conduit and is transmitted to the conduit by the linkage. By varying the diameter of the bellows, the counteracting force may be adjusted to any desired value. For example, it may completely nullify the atmospheric thrust forces on the conduit or, if desired, it may reduce the value thereof to a safe and reasonable limit. In accordance with the usual practice, since the conduit is adapted to convey hot fluids, temperature expansion compensating elements may be provided to permit expansion and contraction of the conduit without imposition of stresses on the turbine units.

Figure 2:
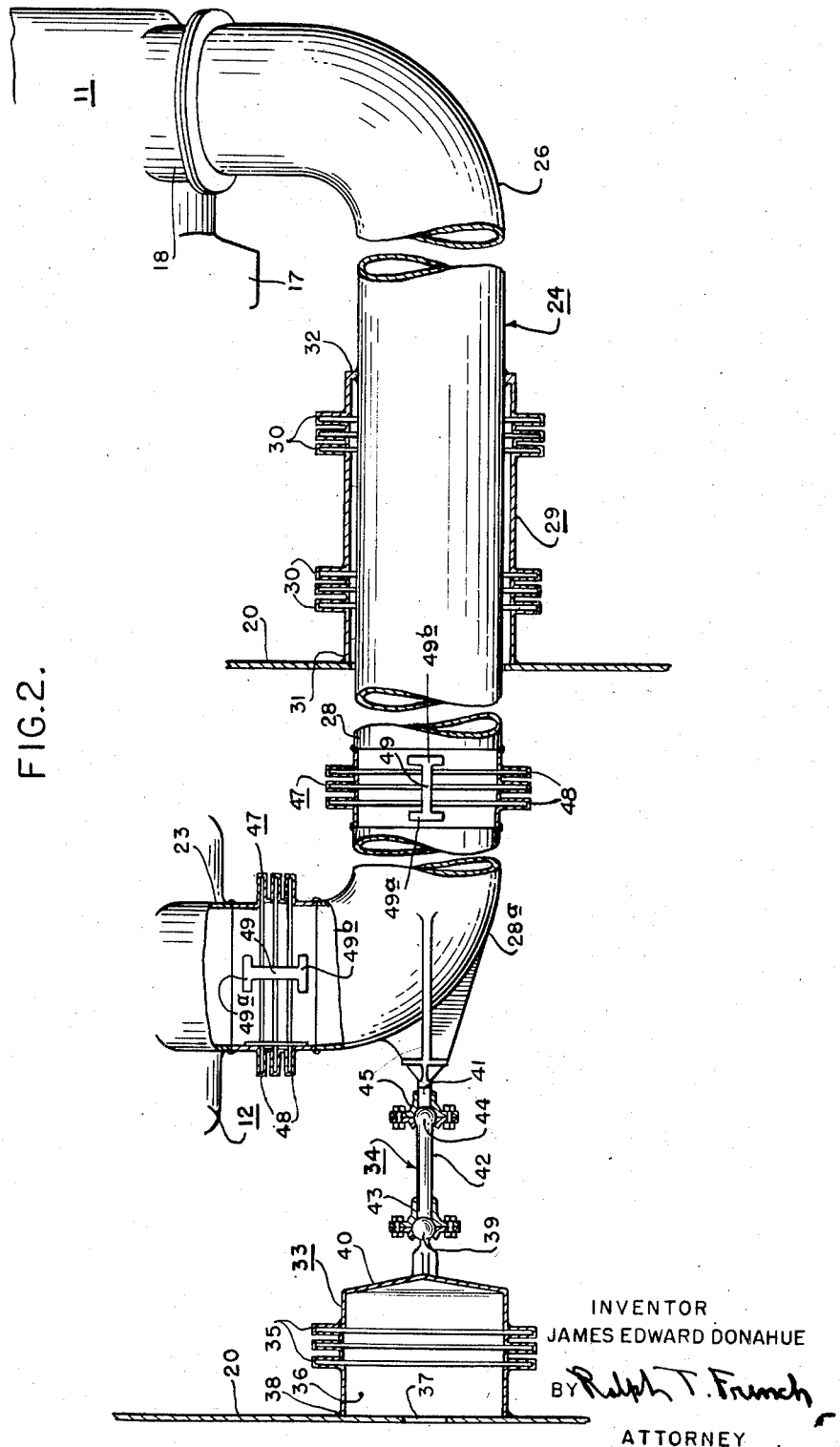

These and other objects are effected by the invention as will be apparent from the following description taken in connection with the accompanying drawings, forming a part of this application, in which:

Fig. 1 is a side elevation, with portions in section, of a typical compound turbine incorporating a cross-under conduit arrangement construction in accordance with the invention; and Fig. 2 is an enlarged fragmentary view of the conduit arrangement, with portions in section to illustrate the invention more clearly.

Referring to the drawings in detail, more particularly Fig. 1, there is shown schematically a typical compound steam turbine 10 comprising a first or intermediate pressure turbine unit 11 and a second or low-pressure turbine unit 12 connected in tandem and supported upon a foundation 13 by a pair of pedestals 14 and 15 of any conventional type. The high-pressure turbine unit has not been shown since it has no bearing on the invention; however, as is well known in the art, it may be connected in tandem with the units 11 and 12 and disposed to the right thereof as viewed in the figure.

The intermediate-pressure turbine unit, hereinafter referred to as the I. P. unit, has a plurality of steam inlets 16, 17 and a steam outlet 18. The low-pressure turbine unit, hereinafter referred to as the L. P. unit, has an exhaust casing 19 provided with a depending wall 20 communicating with a conventional condenser 21 (partially shown) and connected thereto by means including a pair of abutting peripheral flanges 20a and 21a. The L. P. unit is further provided with a steam inlet 23 disposed within the confines of the exhaust casing 19 and connected to the steam outlet 18 of the I. P. unit by a conduit structure generally indicated 24. The conduit structure 24 extends through an opening 25 in the exhaust casing wall 20 and has an outer conduit portion 26 having a flanged or welded connection 27 with the outlet 18 of the I. P. unit and subject to atmospheric pressure. The conduit structure also has an inner conduit portion 28 disposed within the confines of the exhaust casing 19 and subject to the sub-atmospheric pressure of the exhaust steam from the L. P. unit en route to the condenser 21. The conduit portion 28 is provided with an elbow member 28a for conveying steam upwardly into the inlet 23.

Since the conduit structure 24 carries steam at elevated temperatures and pressures and is subject to thermal expansion, its point of entry through the opening 25 in the exhaust casing wall is provided with a yieldable, fluid-tight sealing structure 29 including a bellows having a plurality of convolutions 30 enveloping the adjacent portion of the conduit and having a terminal portion 31 connected to the wall 20 in a fluid-tight manner and having an opposite terminal portion 32 connected to the conduit in a fluid-tight manner. Thus, freedom of movement of the conduit relative to the wall 20 is permitted without leakage at the point of entry.

A pressure-responsive structure 33 is attached to the exhaust casing wall 20 at a point opposite to the point of entry of the conduit portion 28 and is connected to a force transmitting linkage 34 of any desired type which is, in turn, connected to the conduit elbow 28a.

The pressure responsive structure 33 may be of any conventional type, for example, as illustrated in Fig. 2 it may be of the bellows type having a series of axially yieldable convolutions 35 and having an interior chamber 36 communicating with the atmosphere through an opening 37 in the casing wall 20. The bellows is disposed within the confines of the exhaust casing and is rigidly secured to the wall 20 around its terminal periphery by a fluid tight seal 38. Hence, the interior of the bellows is subject to variations in pressure of the atmosphere while the external surfaces thereof are subject to pressure of the exhaust steam within the exhaust casing. The differential in pressure imposes a resultant thrust on the pressure responsive structure 33 axially in the direction to the right as viewed in the figures. This force is transmitted through the linkage 34 to counteract the atmospheric thrust on the conduit portion 26 effective in the opposite direction.

The pressure transmitting linkage 34 preferably is of the type which permits freedom of motion of conduit elbow 28a but which is effective to transmit forces in a generally axial direction. As illustrated, the linkage 34 is of the type having a male spherical portion 39 connected to an end cap 40 of the pressure responsive mechanism 33 and a cylindrical male portion 41 rigidly connected to the conduit elbow 28a and having a central force transmitting member 42 rigidly connected to a spherical socket member 43 which snugly receives the spherical male portion 39. The opposite end of the member 42 has a spherical male portion 44 which is snugly received within a similar spherical socket 45 rigidly attached to the cylindrical end member 41. Thus, forces may be transmitted by the linkage 34 in either direction, that is, to the left or to the right while still permitting relative rotational movement between its elements.

Since, as previously mentioned, the conduit structure 24 conveys fluid at high temperatures and pressures, which create thermal expansion of the conduit and produce thrust forces therein, the inner conduit portion 28 may be provided with a pair of thermal expansion compensating elements 47, 47 connected to opposite ends respectively of the conduit elbow 28a. The thermal expansion compensating elements 47 may be identical in form and of any desirable type. Each of the compensating elements may be provided with a series of axially yieldable convolutions 48 permitting free axial movement of the conduit in response to temperature change. In addition, several struts 49 disposed within the confines of the expansion elements 47 and having their ends 49a and 49b rigidly connected at points beyond the convolutions, serve to resist axial movement of the convolutions 48 incurred by the thrust effect of the fluid flowing therethrough.

In operation, steam is delivered to the I. P. turbine unit 11 by means of the steam inlets 16 and 17 and after being expanded within the unit is delivered through the outlet 18 to the steam inlet 23 of the L. P. turbine unit 12 via the conduit structure 24. As the conduit is heated and becomes elongated the yieldable seal structure 29 yields axially to allow such movement. Also, the thermal expansion compensating elements 47 permit longitudinal movement of the inner portion 28 of the conduit while the struts 49 expand to limit the movement of the conduit by the internal thrust forces. After the steam is utilized in the L. P. unit, it is exhausted in the direction of the arrows through the exhaust casing 19 and is delivered to the condenser 21.

With this arrangement, the outer conduit portion 26 is subject to thrust forces of the atmosphere while the inner portion 28 of the conduit is subjected to lesser thrust of the exhaust steam within the casing 19. The resultant between the two thrusts is a thrust directed axially tending to move the conduit relative to the exhaust casing wall 20 toward the left as shown in figures. This resultant thrust is nullified by the pressure responsive structure 33, since the atmospheric pressure within the chamber 36 is larger than the exhaust steam pressure on the outer surface of the pressure responsive structure and creates a net thrust in an axial direction to the right as viewed in the figures. This compensating thrust is transmitted through the linkage 34 to the conduit elbow 28a, thereby placing the conduit itself under stress but preventing such stresses being transmitted to the exhaust casing wall 20 or to the steam outlet connections at 18 and the steam inlet connections at 23. Undesirable stresses are also prevented from being set up in the thermal expansion compensating element 47 adjacent to the L. P. turbine inlet 23. Thus, stresses on the turbine units and in the conduit parts are maintained at a low value. Since the thermal expansion compensating elements 47 permit limited movement of the conduit portion 28 due to expansion thereof the linkage 34 may shift from the axially aligned position shown in the drawings to accommodate such movement. Also, should the conduit portion 28 rotate axially, the linkage 34 will be rotated to accommodate such rotation without loss of its pressure transmitting characteristics.

It will now be seen that with the above arrangement a simple and relatively low cost cross-under conduit arrangement is provided which enhances the contours of the compound turbine since it is disposed below the turbine units and is not visible to the observer. Also, it will be seen that the cross-under conduit arrangement is effected without creating thrust on the turbine units even though the conduit has one portion disposed in a region of higher pressure than its other portion.

It will further be seen that the cross-under conduit structure described above is free to move relative to the exhaust wall without causing excessive thrust thereupon which would otherwise necessitate more rigid wall thicknesses.

Although the pressure responsive structure 33 has been described as nullifying the thrust of the atmosphere upon the conduit structure, by varying the diameter of the convolutions 35 and in effect varying the internal surface area exposed to the atmosphere, the counteracting thrust provided thereby may be varied as desired within large limits. For example, if it is desired to control the thrust on the conduit so that some thrust to the left is desirable the diameter of the convolutions 35 may be made smaller, whereas if it is desired to create a larger counteracting thrust the diameter of the convolutions 35 may be made larger thereby resulting in a net thrust in a direction to the right as viewed in the figures.

Although the invention has been shown in connection with a compound turbine, it will be understood that the invention may be advantageously utilized anywhere where it is desired to convey fluid within a conduit which extends through a partition and has portions disposed in regions of different pressures, so that a thrust is created thereupon which may have undesirable effects on the partition between the regions of different pressures as well as the connections of the conduit.

While the invention has been shown in but one form, it will be obvious to those skilled in the art that it is not so limited, but is susceptible of various changes and modifications without departing from the spirit thereof.

What is claimed is:

1. In combination a casing having a wall subjected to an external variable ambient pressure and an internal ambient pressure of different values, means including a conduit extending through said wall and having one portion subjected on its external surface to said external ambient pressure and having another portion subjected on its external surface to said internal ambient pressure, whereby the differential between said external and said internal ambient pressures is effective to exert a force tending to displace said conduit axially in one direction, means providing a fluid-tight seal between said conduit and said wall, means responsive to pressure connected to said wall at a point substantially opposite said sealing means, said pressure responsive means being subject to said external pressure on one side and to said internal pressure on the other side, whereby the differential pressure across said pressure responsive means is effective to exert a force in an opposite direction, and means disposed within said casing and connecting said pressure responsive means to said conduit for transmitting said forces therebetween.

2. The structure recited in claim 1 in which the conduit is slidably received in the wall and is adapted to convey elastic fluid at a higher temperature and pressure than the external and internal ambients, and in which the sealing means includes a bellows structure encompassing a portion of the conduit adjacent the wall and having one end portion connected to the wall and the other end connected to the conduit, thereby permitting axial movement of the conduit relative to said wall.

3. The structure recited in claim 2 in which one end of the conduit is connected to an exhaust outlet of a first fluid utilizing device and the other end of the conduit is connected to the inlet of a second fluid utilizing device, said second fluid utilizing device having an exhaust outlet communicating with the casing and adapted to discharge fluid into the casing and to provide the internal ambient pressure.

4. In combination, an elastic fluid utilizing device having a casing provided with an exhaust opening, means including a conduit connected at one end to said exhaust opening for conveying exhausted fluid therefrom and having a first portion extending through a first region of ambient pressure, a wall defining a second region of different ambient pressure, said conduit extending through said wall into said second region and having a second portion subject to said different ambient pressure, whereby said conduit is subject to an external differential pressure tending to displace the same, means providing a fluid-tight seal between said conduit and said wall, means responsive to pressure connected to said wall at a point opposite said seal means, said pressure responsive means being subject to said first pressure on one side and to said different pressure on the other side, and means connecting said pressure responsive means to said conduit for transmitting forces therebetween in a direction opposite to the displacement forces on said conduit.

5. In combination, a high pressure turbine having an exhaust fluid outlet, a low pressure turbine having a fluid inlet and an exhaust fluid outlet disposed adjacent each other and extending downwardly, said low pressure turbine having a walled casing encompassing said low pressure fluid inlet and outlet, means including a crossunder conduit connecting said high pressure exhaust outlet to said low pressure inlet, said conduit extending through said casing wall and having a first portion disposed externally of said casing and subject to atmospheric pressure and a second portion disposed within said casing and subject to pressure of fluid exhausted into said casing from said low pressure turbine outlet, said conduit being slidably received in said wall, whereby the differential between said atmospheric pressure and the pressure within said casing is effective to exert a force tending to displace said conduit relative to said casing wall, yieldable means providing a fluid-tight seal between said conduit and said wall, means responsive to pressure connected to said wall at a point opposite said seal means, said pressure responsive means being subject to said atmospheric pressure on one side and to the pressure within said casing on the other side, whereby the differential pressure acting on said pressure responsive means is effective to exert a force in a direction opposite to the force on said conduit, and means connecting said pressure responsive means to said second portion of said conduit for transmitting said forces therebetween.

6. The structure recited in claim 5 in which said second portion of the conduit is non-rectilinear and is provided with thermal expansion compensating means, and in which the connecting means is unyielding in force transmitting direction but is free to move in a direction at an angle to said force transmitting direction, whereby said conduit is permitted to assume a stable position without imparting stresses to the turbines.

References Cited in the file of this patent

UNITED STATES PATENTS

| 1,896,062 | Berry | Feb. 7, 1933 |

FOREIGN PATENTS

| 534,704 | Germany | Oct. 1, 1931 |